(12) United States Patent
Teraue (10) Patent No.: US 7,551,309 B2
(45) Date of Patent: Jun. 23, 2009

(54) IMAGE DATA OUTPUT APPARATUS, AND IMAGE OUTPUT PROGRAM STORAGE MEDIUM

(75) Inventor: Eiji Teraue, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 1408 days.

(21) Appl. No.: 10/025,555

(22) Filed: Dec. 26, 2001

(65) Prior Publication Data

US 2002/0101628 A1 Aug. 1, 2002

(30) Foreign Application Priority Data

Jan. 31, 2001 (JP) .............................. 2001-022837

(51) Int. Cl.
*G06K 15/00* (2006.01)
*G06F 17/00* (2006.01)

(52) U.S. Cl. ..................................... 358/1.18; 715/209

(58) Field of Classification Search ................ 358/1.15, 358/540, 450, 1.18, 1.2, 296, 487, 401, 449, 358/1.9, 537, 1.14; 715/209, 517, 520, 274, 715/212, 236; 399/17, 19, 45, 194, 370, 399/405, 748; 382/175, 307, 309; 400/62
See application file for complete search history.

(56) References Cited

U.S. PATENT DOCUMENTS

| 5,053,831 | A | * | 10/1991 | Ishiguro et al. | ............. | 399/370 |
| 5,138,670 | A | * | 8/1992 | Nakajima et al. | ............ | 382/282 |
| 6,512,899 | B2 | * | 1/2003 | Shimada et al. | ................ | 399/82 |
| 2002/0122165 | A1 | * | 9/2002 | Robinson et al. | .............. | 355/77 |
| 2003/0072486 | A1 | * | 4/2003 | Loui et al. | ................... | 382/175 |

FOREIGN PATENT DOCUMENTS

| JP | 2-143379 A | 6/1990 |
| JP | 4-252665 A | 9/1992 |
| JP | 6-311347 A | 11/1994 |
| JP | 6-313962 A | 11/1994 |
| JP | 2000-270199 A | 9/2000 |

* cited by examiner

*Primary Examiner*—Saeid Ebrahimi Dehkordy
(74) *Attorney, Agent, or Firm*—Sughrue Mion, PLLC (57) ABSTRACT

When it is intended that an image output apparatus is used to output a plurality of images onto a sheet, an automatic selection for a sheet is performed in an algorithm that a sheet of paper of the minimum size is selected from among a plurality of sizes of sheets within a range satisfying such a condition that an image disposed on a sheet of paper of the maximum size can be disposed in its entirety, through review of the sheet after images are disposed by the number permitted in arrangement on a sheet of paper as many as possible.

2 Claims, 7 Drawing Sheets

IMAGE DATA OUTPUT APPARATUS, AND IMAGE OUTPUT PROGRAM STORAGE MEDIUM

BACKGROUND OF THE INVENTION

1. Field of the Invention

The present invention relates to an image data output apparatus for outputting image data, and an image data output program storage medium storing an image data output program, when executed in a computer, which causes the computer to operate as the image data output apparatus.

2. Description of the Related Art

Hitherto, there is performed such a matter that image data is fed to an image processing apparatus, which is implemented using a personal computer and the like, so that an edition of images on the image data is performed or color correction and the like is performed, and image data after such edition and color correction is outputted toward an image output apparatus such as a color printer so that the image output apparatus outputs a desired image.

When it is intended that this image output apparatus is used to output a plurality of images on a sheet, an image processing apparatus side determines a position on the same size of area as the sheet in the order that a plurality of image data representative of the plurality of images is fed to the image processing apparatus, in such a manner that the respective images are not overlapped with one another taking into consideration a size of each of the images, a designated margin of the sheet and a designated interval between the adjacent images, and when new image data is fed, at the time point when an image represented by the new image data is too large to be accommodated in a space other than a space in which the images are already disposed, on the same size of area as the sheet, image data representative of the whole images already disposed is outputted.

However, according to the above-mentioned method, when it is intended to output a plurality of images onto a sheet of paper, in some size of a designated sheet to which an image is be outputted and in some size of the respective images, there is a possibility that a large margin remains on the outputted sheet. In this case, the sheet is damaged with respect to the effective utilization.

SUMMARY OF THE INVENTION

In view of the foregoing, it is an object of the present invention to provide an image data output apparatus contributing to the effective utilization of a sheet and an image data output program storage medium storing an image data output program, when executed in a computer, which causes the computer to operate as the image data output apparatus.

To achieve the above-mentioned object, the present invention provides an image data output apparatus comprises:

a data obtaining section for sequentially obtaining a plurality of image data representative of a plurality of images;

a data editing section for performing a layout processing that images represented by the image data sequentially obtained by said data obtaining section are disposed in order of obtaining of the image data by a number permitted in arrangement as many as possible on a maximum size of sheet of a plurality of predetermined sizes of sheets, and editing image data representative of images disposed by the number permitted in arrangement as many as possible on the maximum size of one sheet onto image data representative of whole images to be recorded on the one sheet;

a sheet selection section for automatically selecting from among the plurality of predetermined sizes of sheets a minimum size of sheet capable of recording the whole images represented by image data edited by said data editing section; and a data output section for outputting the image data edited by said data editing section together with data representative of a size of a sheet onto which the whole images represented by the image data are recorded.

According to the present invention as mentioned above, when it is intended that an image output apparatus is used to output a plurality of images onto a sheet, an automatic selection for a sheet is performed in an algorithm that a sheet of paper of the minimum size is selected from among a plurality of sizes of sheets within a range satisfying such a condition that an image disposed on a sheet of paper of the maximum size can be disposed in its entirety, through review of the sheet after images are disposed by the number permitted in arrangement on a sheet of paper as many as possible. Thus, the whole images disposed by the number permitted in arrangement are outputted onto the minimum size of sheet on which the whole images can be disposed. Accordingly, it is possible to prevent a large margin from remaining on the outputted sheet and thereby utilizing effectively the sheet.

In the image data output apparatus according to the present invention as mentioned above, it is acceptable that in a state that one or more images are already disposed on a sheet of paper, when a new image represented by new image data subsequently obtained is disposed on the sheet, said data editing section performs processing for disposing the new image, while an arrangement position on the sheet of the images already disposed on the sheet is fixed. Or alternatively, it is acceptable that in a state that one or more images are already disposed on a sheet of paper, when a new image represented by new image data subsequently obtained is disposed on the sheet, said data editing section performs processing for disposing the new image, while a position on the sheet of the images already disposed on the sheet is permitted in movement.

Permission of a rearrangement of images already arranged on a sheet makes it possible to enhance a possibility that a newly obtained image can be disposed on the same sheet and thereby contributing to the more effective utilization for the sheet.

Further, in the image data output apparatus according to the present invention as mentioned above, it is preferable that said data editing section performs processing in which images are disposed by a number permitted in arrangement as many as possible, permitting an arrangement in which images turn sideways.

Permission of an arrangement in which images turn sideways makes it possible to enhance a possibility that more images can be disposed on a sheet and thereby contributing to the more effective utilization for the sheet.

Further, to achieve the above-mentioned object, the present invention provides an image data output program storage medium storing an image data output program in which when the image data output program is executed in a computer, an image data output apparatus is implemented in the computer, said image data output apparatus comprising:

a data obtaining section for sequentially obtaining a plurality of image data representative of a plurality of images;

a data editing section for performing a layout processing that images represented by the image data sequentially obtained by said data obtaining section are disposed in order of obtaining of the image data by a number permitted in arrangement as many as possible on a maximum size of sheet of a plurality of predetermined sizes of sheets, and editing image data representative of images disposed by the number permitted in arrangement as many as possible on the maximum size of one sheet onto image data representative of whole images to be recorded on the one sheet;

a sheet selection section for automatically selecting from among the plurality of predetermined sizes of sheets a minimum size of sheet capable of recording the whole images represented by image data edited by said data editing section; and a data output section for outputting the image data edited by said data editing section together with data representative of a size of a sheet onto which the whole images represented by the image data are recorded.

In the image data output program storage medium according to the present invention as mentioned above, it is acceptable that in a state that one or more images are already disposed on a sheet of paper, when a new image represented by new image data subsequently obtained is disposed on the sheet, said data editing section performs processing for disposing the new image, while an arrangement position on the sheet of the images already disposed on the sheet is fixed.

Or alternatively, in the image data output program storage medium according to the present invention as mentioned above, it is acceptable that in a state that one or more images are already disposed on a sheet of paper, when a new image represented by new image data subsequently obtained is disposed on the sheet, said data editing section performs processing for disposing the new image, while a position on the sheet of the images already disposed on the sheet is permitted in movement.

Further, in the image data output program storage medium according to the present invention as mentioned above, it is acceptable that said data editing section performs processing in which images are disposed by a number permitted in arrangement as many as possible, permitting an arrangement in which images turn sideways.

DETAILED DESCRIPTION OF PREFERRED EMBODIMENTS

Embodiments of the present invention will be described with reference to the accompanying drawings.

Figure 1:
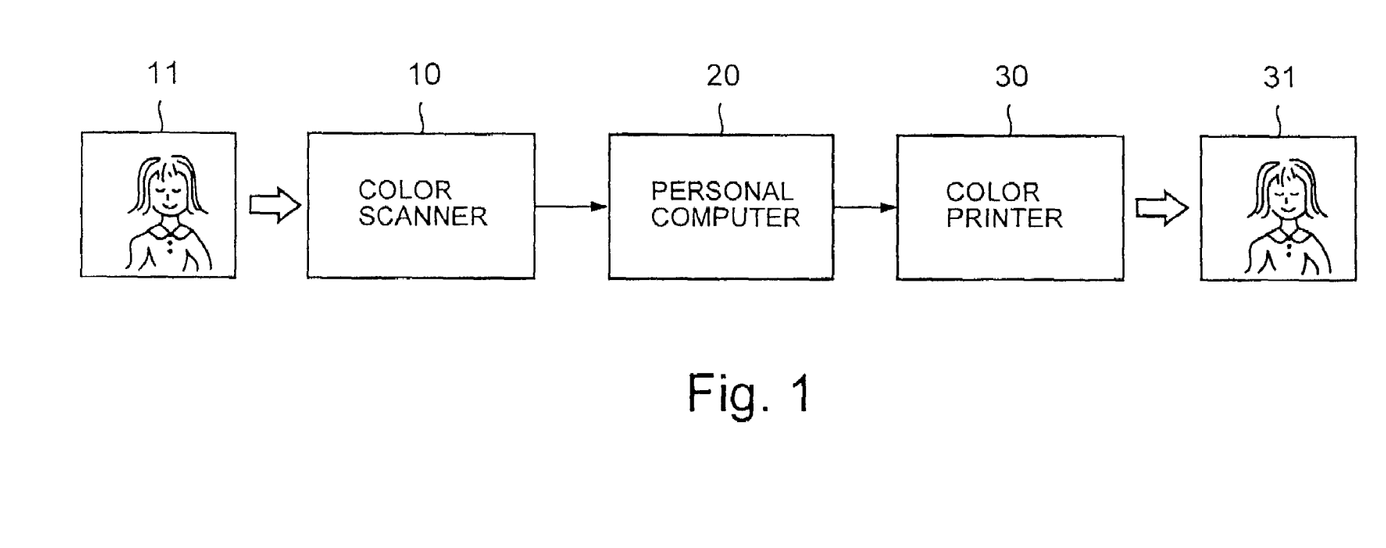
FIG. 1 is a schematic constitution view of an image input-image data editing-image output system to which an embodiment of the present invention is applied.

FIG. 1 is a schematic constitution view of an image input-image data editing-image output system to which an embodiment of the present invention is applied.

A color scanner 10 reads an original image 11 and creates image data for three colors consisting of cyan (C) magenta (M) and yellow (Y). The image data of CMY produced by the scanner 10 is fed to a personal computer 20. The personal computer 20 converts the image data obtained by the scanner 10 into image data for image output suitable for a color printer 30, which will be described later. The image data for image output is fed to the color printer 30. The color printer 30 performs a printing output in accordance with the input image data so that a print image 31 is formed.

In the system shown in FIG. 1, as an example of an image output apparatus for outputting an image based on image data, there is shown the color printer 30. It is noted, however, that the color printer 30 can be replaced by an electrophotographic type of color printer, an ink jet type of color printer, or such a type of printer that a printing paper is exposed with a modulated laser light and the exposed printing paper is developed. That is, a printing type or scheme is not important for the color printer 30.

An aspect as an embodiment of the present invention in the system shown in FIG. 1 resides in processing contents to be executed inside the personal computer 20. Hereinafter, there will be described the personal computer 20.

Figure 2:
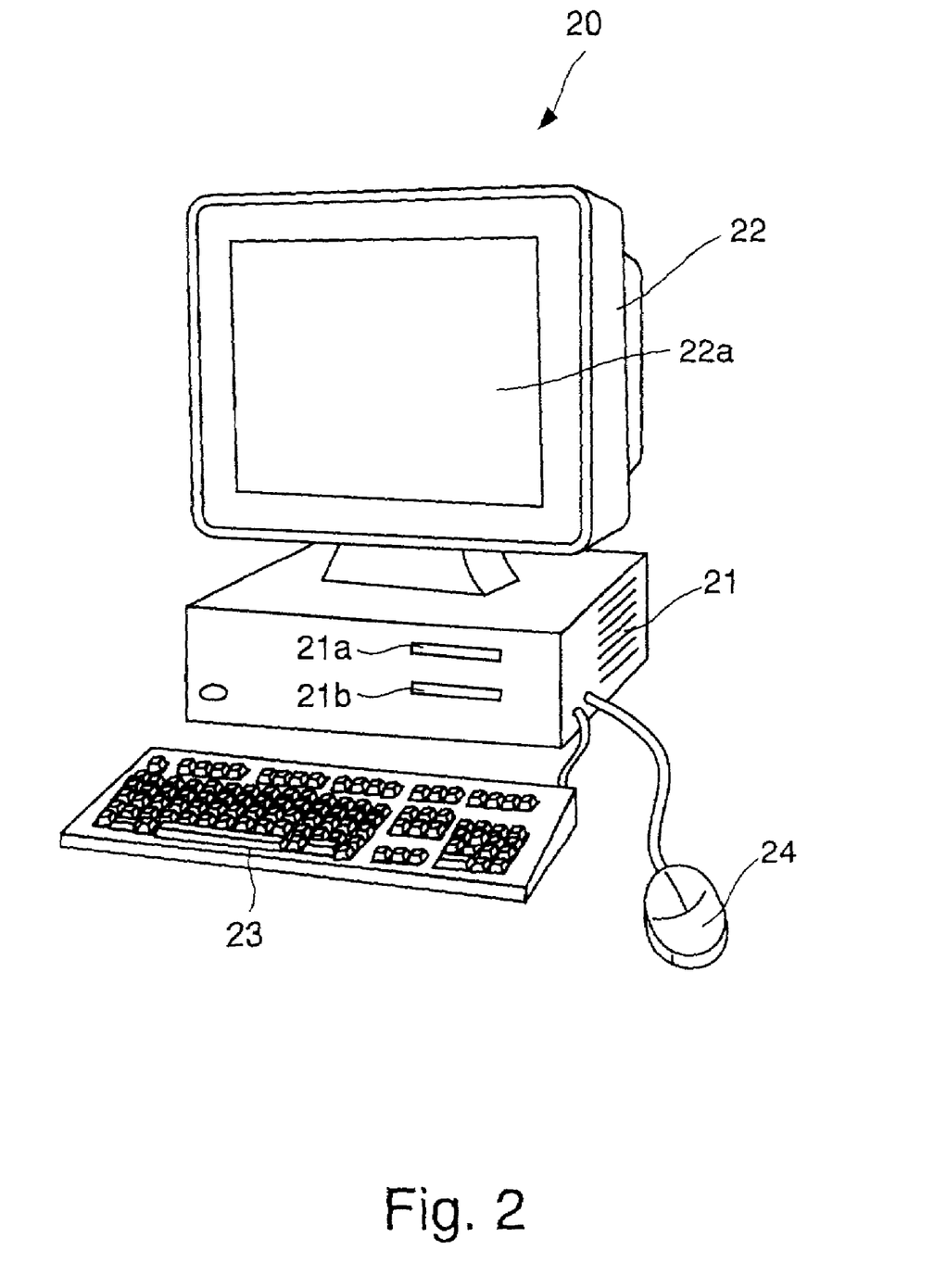
FIG. 2 is a perspective view of a personal computer shown in FIG. 1.
Figure 3:
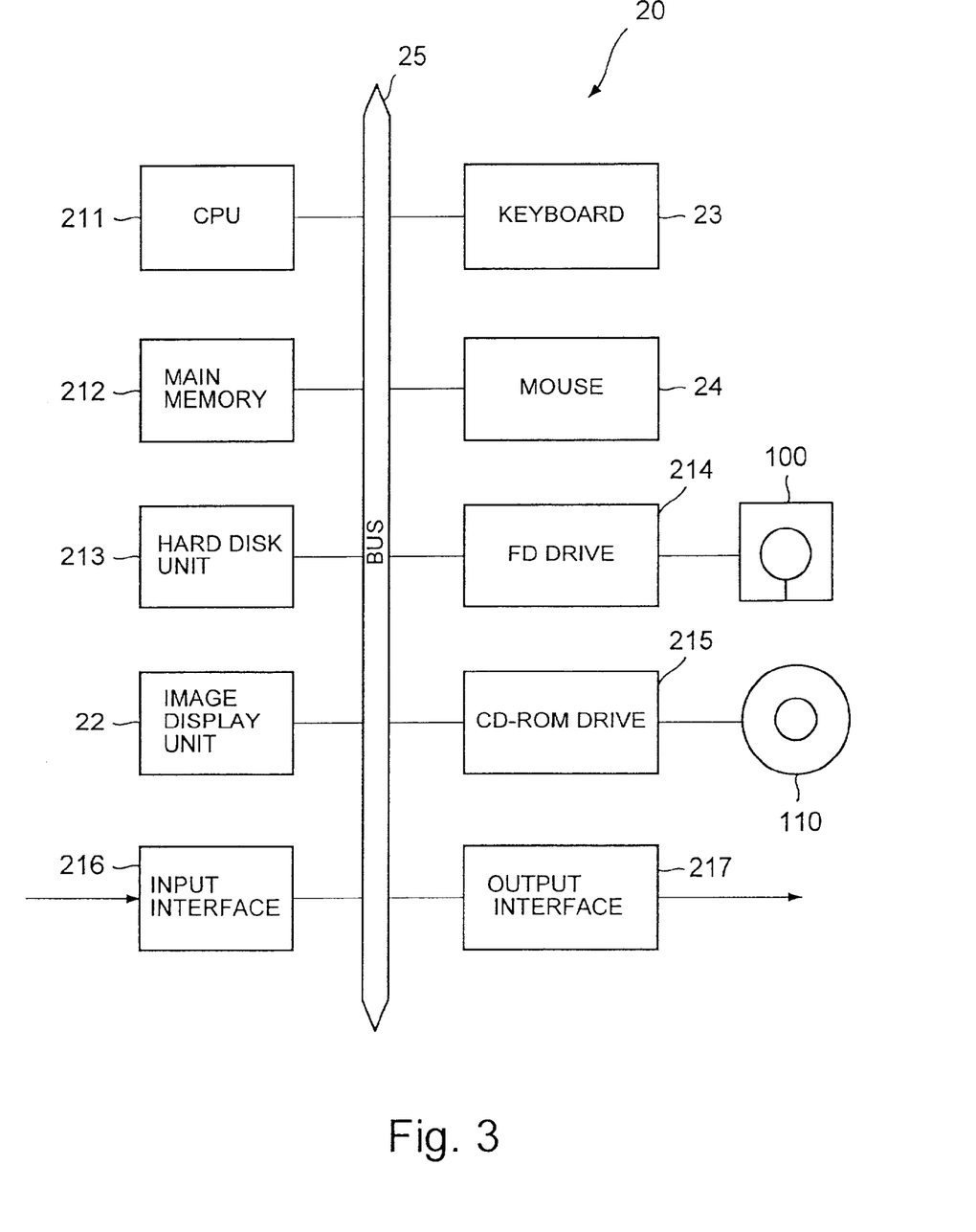
FIG. 3 is a hardware structural view of the personal computer.

FIG. 2 is a perspective view of the personal computer 20 shown in FIG. 1. FIG. 3 is a hardware structural view of the personal computer 20.

The personal computer 20 comprises, on an external appearance, a main frame unit 21, an image display unit 22 for displaying an image on a display screen 22a in accordance with an instruction from the main frame unit 21, a keyboard 23 for inputting various sorts of information to the main frame unit 21 in accordance with a key operation, and a mouse 24 for inputting an instruction according to, for example, an icon and the like, through designation of an optional position on the display screen 22a, the icon and the like being displayed on the position on the display screen 22a. The main frame unit 21 has a floppy disk mounting slot 21a for mounting a floppy disk, and a CD-ROM mounting slot 21b for mounting a CD-ROM.

The main frame unit 21 comprises, as shown in FIG. 3, a CPU 211 for executing a various types of program, a main memory 212 in which a program stored in a hard disk unit 213 is read out and developed for execution by the CPU 211, the hard disk unit 213 for saving various types of programs and data, an FD drive 214 for accessing a floppy disk 100 mounted thereon, a CD-ROM drive 215 for accessing a CD-ROM 110 mounted thereon, an input interface 216 connected to the color scanner 10 (cf. FIG. 1), to receive image data from the color scanner 10, and an output interface 217 to transmit image data to the color printer 30. These various types of elements are connected via a bus 25 to the image display unit 22, the keyboard 23 and the mouse 24.

The CD-ROM 110 stores therein an image data output program for causing the personal computer 20 to operate as an image data output apparatus. The CD-ROM 110 is mounted on the CD-ROM drive 215 so that the image data output program, which is stored in the CD-ROM 110, is up-loaded on the personal computer 20 and is stored in the hard disk unit 213.

Figure 4:
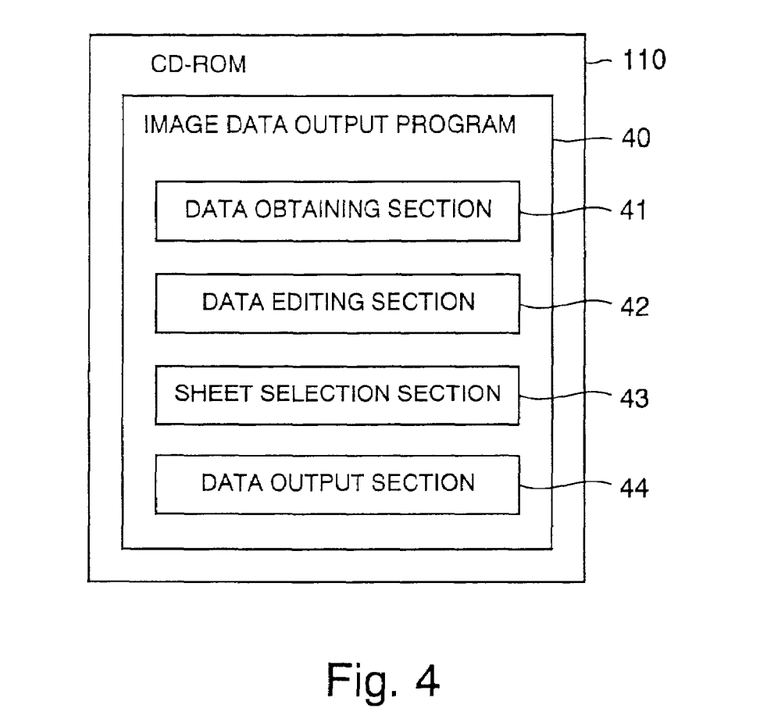
FIG. 4 is a view showing an embodiment of an image data output program storage medium according to the present invention.

FIG. 4 is a view showing an embodiment of an image data output program storage medium according to the present invention. The CD-ROM 110 shown in FIG. 3 is an example of the image data output program storage medium, and the image data output program 40 shown in FIG. 4 is stored in the CD-ROM 110.

An image data output program 40 comprises a data obtaining section 41, a data editing section 42, a sheet selection section 43 and a data outputting section 44. Contents of the respective sections of the image data output program 40 will be described later.

Figure 5:
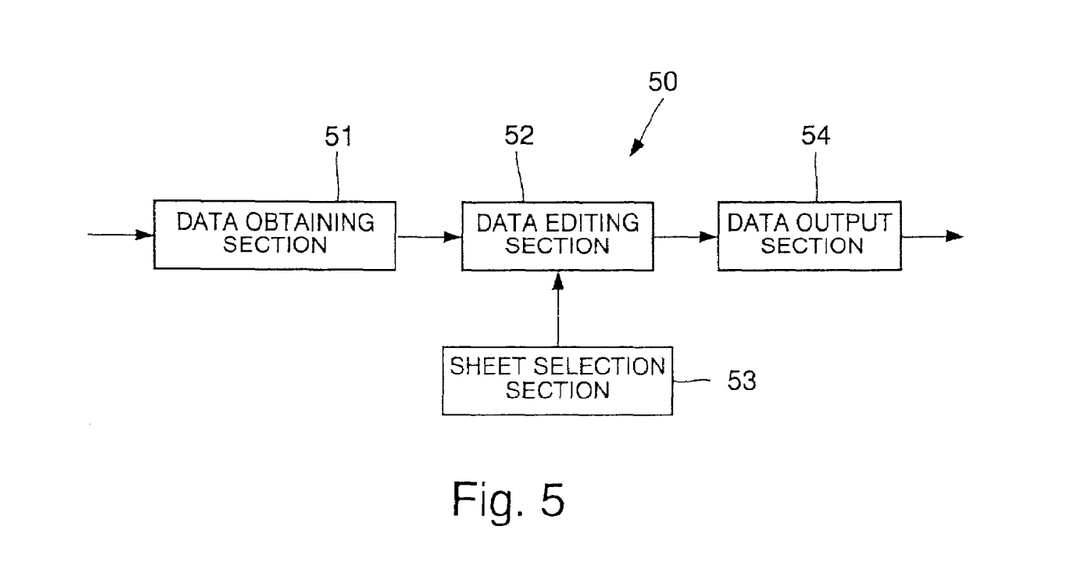
FIG. 5 is a functional block diagram of an embodiment of an image data output apparatus according to the present invention.

FIG. 5 is a functional block diagram of an embodiment of an image data output apparatus according to the present invention.

An image data output apparatus 50 shown in FIG. 5 is implemented when the image data output program 40 shown in FIG. 4 is loaded onto the personal computer 20 shown in FIGS. 1 to 3 and is executed by the personal computer 20.

The image data output apparatus 50 shown in FIG. 5 comprises a data obtaining section 51, a data editing section 52, a sheet selection section 53 and a data outputting section 54. The data obtaining section 51, the data editing section 52, the sheet selection section 53 and the data outputting section 54 comprise combinations of the data obtaining section 41, the data editing section 42, the sheet selection section 43 and the data outputting section 44, and hardware and operation systems (OS) of the personal computer 20, which are necessary for implementing functions of their associated software components, respectively.

Hereinafter, there will be described a function of the present embodiment.

The data obtaining section 51 sequentially obtains image data read from the color scanner 10 shown in FIG. 1 and image data created in the personal computer 20 shown in FIG. 1 in accordance an operation of the keyboard 23 or the mouse 24 of the personal computer 20 shown in FIG. 2 by an operator.

The data editing section 52 disposes images represented by the image data sequentially obtained by the data obtaining section 51 in the order that the image data is obtained by the maximum number of images in which the images can be disposed on a sheet of paper having the maximum size, and edits image data representative of the images disposed by the maximum number of images in which the images can be disposed on a sheet of paper having the maximum size to image data representative of the whole images to be recorded on a sheet of paper. According to the present embodiment, at the time of the editing, in a state that one or more images are already disposed on a sheet of paper, when a new image is disposed, it is optionally selected between a processing in which the new image is disposed, while the disposal position of the images already disposed is fixed, and a processing in which the new image is disposed, while the rearrangement of the images already disposed is permitted. Further, according to the present embodiment, at the time of the editing, it is possible to select whether an arrangement, in which images turn sideways, is permitted.

The sheet selection section 53 selects from among a plurality of sizes of sheets a sheet of paper of the minimum size within a range satisfying such a condition that an image disposed on a sheet of paper of the maximum size can be disposed in its entirety.

The data outputting section 54 outputs the image data after editing by the data editing section 52 together with data representative of a size of a sheet on which the image represented by the image data in its entirety is recorded.

The image data outputted from the data outputting section 54 is fed to the color printer 30 shown in FIG. 1 so that the color printer 30 outputs the image disposed in its entirety by the maximum numbers permitted in arrangement as many as possible on the minimum size of sheet in which the disposed image is permitted in arrangement in its entirety.

Figure 6:
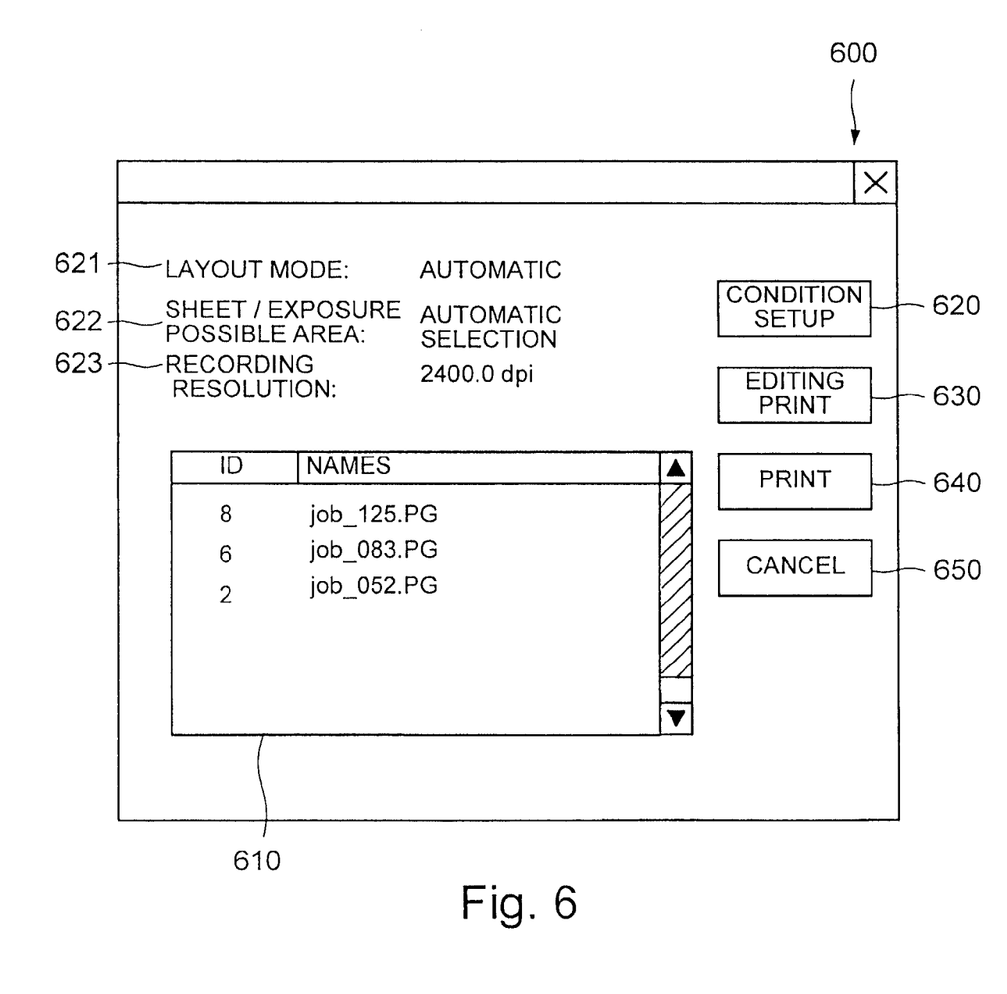
FIG. 6 is a view showing a job layout manager screen.

FIG. 6 is a view showing a job layout manager screen.

When a predetermined operation is performed through an operation of the keyboard 23 or the mouse 24 of the personal computer 20 shown in FIG. 2, a job layout manager screen 600 shown in FIG. 6 is displayed on the display screen 22a of the image display unit 22 of the personal computer 20.

Below left the job layout manager screen 600, there is displayed a list box 610 on which ID numbers and names appended to the image data for the layout processing are displayed in the order of obtaining of the image data by the data obtaining section 51. According to the present embodiment, there are shown an ID number: 2 and a name: job__052.PG for image data obtained first, an ID number: 6 and a name: job__083.PG for image data obtained second, and an ID number: 8 and a name: job__125.PG for image data obtained third.

Further, upper right the job layout manager screen 600, there is provided a condition set up button 620. When the condition set up button 620 is clicked through a mouse operation, a job layout set up screen (cf. FIG. 7) for setting up a condition of the layout processing of the image, which will be described later, is displayed.

Just below the condition set up button 620, there is provided an editing print button 630. When the editing print button 630 is clicked, a job layout preview screen (cf. FIG. 8), which will be described later, is displayed, while the job layout manager screen 600 shown in FIG. 6 is displayed. Whenever image data is inputted, the layout processing according to the condition set up on the job layout set up screen (cf. FIG. 7) displayed through the click of the condition set up button 620 is executed, and the image newly subjected to the layout is displayed on the job layout preview screen (cf. FIG. 8). And in the event that even if it is intended to perform a layout processing for a newly inputted image data, it is impossible to make an arrangement on the remaining space of the sheet, image data representative of the whole images already subjected to the layout is outputted.

Further, when a print button 640 is clicked, it is possible to output image data even at the stage before images are disposed throughout the sheet, for example, at the stage that a piece of image is disposed on the sheet and the further image can be disposed. After the print button 640 is clicked, the subsequent image data to be inputted is subjected to a layout processing onto the new sheet.

Just below the print button 640, there is provided a cancel button 650 for closing the job layout manager screen 600.

Upper left the job layout manager screen 600, there are displayed various conditions for executing the associated processing. Specifically, there are provided a display column 621 for "layout mode", a display column 622 for "sheet/exposure possible area" and a display column 623 for "recording resolution". Here, as the "layout mode", an "automatic" is set up, as the "sheet/exposure possible area", an "automatic selection" is set up, and as the "recording resolution", a "2400.0 dpi" is set up. Those conditions are set up on the job layout set up screen (cf. FIG. 7) which is displayed by clicking the condition set up button 620 located upper right the job layout manager screen 600.

Figure 7:
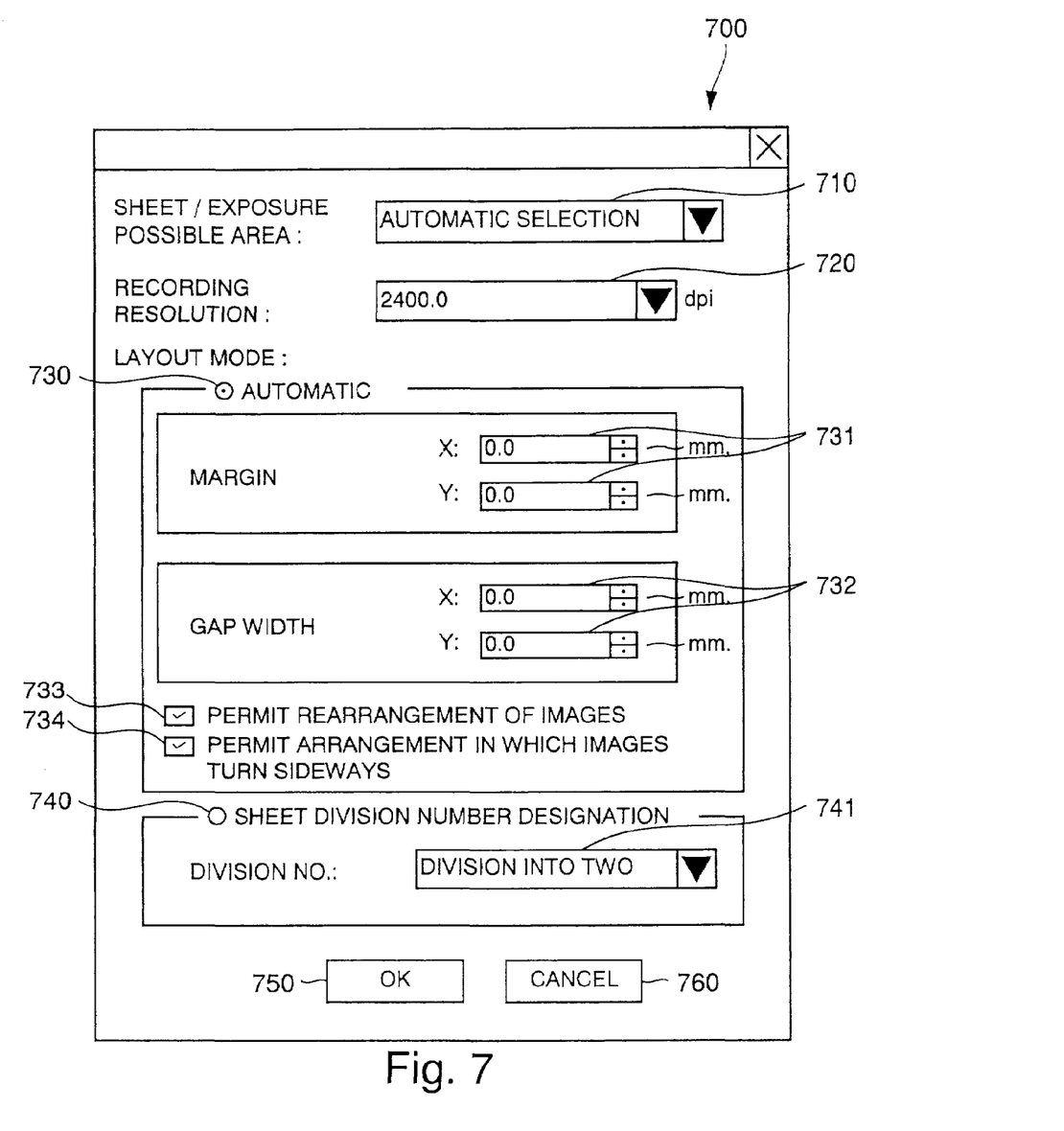
FIG. 7 is a view showing a job layout set up screen.
Figures 8A, 8B:
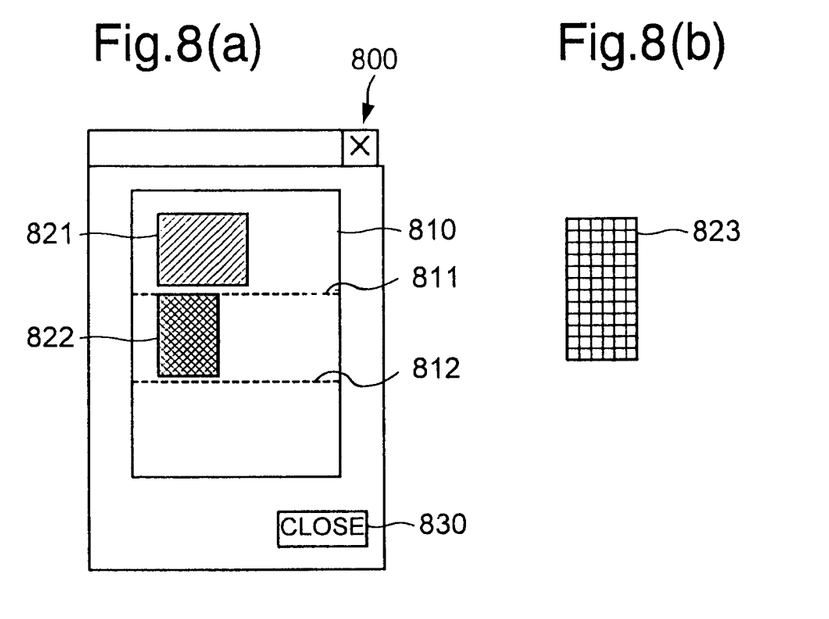
FIGS. 8(a)-8(d) are views showing a job layout preview screen and an output result to a sheet.

FIG. 7 is a view showing a job layout set up screen. A job layout set up screen 700 is displayed when the condition set up button 620 shown in FIG. 6 is clicked.

The job layout set up screen 700 is provided with a selection column 710 for a sheet on which an image is be recorded, a selection column 720 for a recording resolution of the printed image 31 outputted from the color printer 30 shown in FIG. 1.

Below the selection column 720, there are provided a set up column 730 for selecting an automatic layout mode in which images are recorded by the number permitted in arrangement on a sheet of paper as many as possible, designating columns 731 each for a margin size of the edge portion of the sheet in the event that the automatic layout mode is selected, designating columns 732 each for an interval size between images in the event that the automatic layout mode is selected, a set up column 733 for selecting processing for an arrangement of the new image permitting rearrangement of images already disposed on the sheet, and a set up column 734 for selecting processing for permitting an arrangement in which images turn sideways.

Further, there are provided a set up column 740 for selecting a sheet division number designating layout mode different from the automatic layout mode, in which the number of divisions for an area division of a sheet of paper is designated so that images are disposed on the associated divided areas, respectively, and a selection column 741 for the number of divisions in the event that the sheet division number designating layout mode is selected.

FIG. 7 shows a state that "automatic selection" is selected in the selection column 710 by the operation of the mouse, "2400.0 dpi" is selected in the selection column 720 for a recording resolution, and "automatic layout mode" is selected in the set up column 730. When an OK button 750 is clicked under the situation set up as mentioned above for instance, the job layout set up screen 700 shown in FIG. 7 is closed, and the screen returns to the job layout manager screen 600 shown in FIG. 6, so that the respective set up contents are displayed on the display column 621 for the "layout mode", the a display column 622 for "sheet/exposure possible area", and the display column 623 for "recording resolution", upper left the job layout manager screen 600.

According to the present embodiment, "automatic layout mode" is selected on the set up column 730 and "automatic selection" is selected on the selection column 710, so that the automatic selection for a sheet is performed. Here, the automatic selection for a sheet is performed in an algorithm that a sheet of paper of the minimum size is selected from among a plurality of sizes of sheets within a range satisfying such a condition that an image disposed on a sheet of paper of the maximum size can be disposed in its entirety, through review of the sheet after images are disposed by the number permitted in arrangement on a sheet of paper as many as possible. Further, according to the present embodiment, both the set up column 733 and the set up column 734 have been checked, and a layout of images taking into consideration a rearrangement of the images already arranged on the sheet and an arrangement that images turn sideways are performed. Details of processing to be executed by those sets up will be described later.

On the other hand, when the sheet division number designating layout mode is selected on the set up column 740, further, the number of divisions is selected on the selection column 741. This number of divisions designates the number of images to be arranged on a sheet of paper. For example, when a division into two parts is selected, there is executed such processing that images are disposed on areas in which a sheet of paper is divided into two parts, respectively.

The OK button 750 causes the contents set up on the job layout set up screen 700 shown in FIG. 7 to be decided. When the OK button 750 is clicked, the contents set up are decided and the job layout set up screen 700 is closed.

A cancel button 760 makes the set up altered after the job layout set up screen 700 shown in FIG. 7 is opened void and closes this screen.

FIGS. 8(a)-8(d) are views showing a job layout preview screen and an output result to a sheet. A job layout preview screen 800 displays when the editing print button 630 is clicked.

FIG. 8(a) shows the job layout preview screen 800.

According to the example shown here, the color printer 30 is one in which a roll paper is set up and having three sorts of cut length. At the center of the job layout preview screen 800, there is shown, of the three sorts of cut length, an area 810 corresponding to the sheet that is cut with the maximum size of cut length. In the area 810, there are shown a dotted line 811 associated with a cut position of ⅓ of the maximum size, and a dotted line 812 associated with a cut position of ⅔ of the maximum size.

On the area 810, a first image 821 represented by the image data first obtained as shown in FIG. 6 has been already disposed upper left the area 810. And, a second image 822 represented by the image data second obtained as shown in FIG. 6 has been already disposed below the first image 821 on the area 810.

A "close button" 830, which is provided at the lower right of the job layout preview screen 800, is for closing the job layout preview screen 800.

FIG. 8(b) shows the third image 823 represented by the image data third obtained as shown in FIG. 6.

Figure 8C:
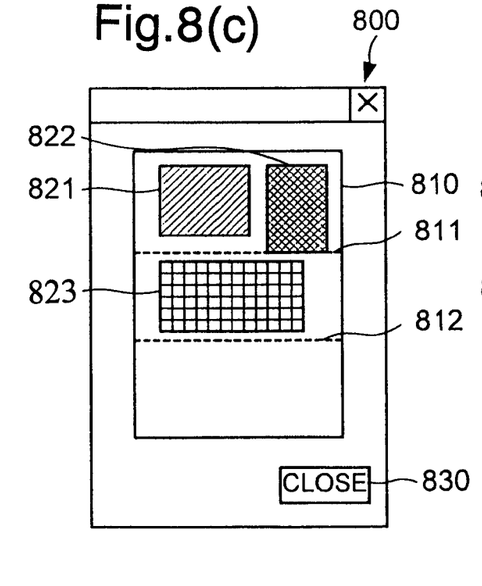

On the area 810 of the job layout preview screen 800 as shown in FIG. 8(c), there is shown a state that the new third image 823 as shown in FIG. 8(b) is disposed.

According to the example shown here, the set up column 733 shown in FIG. 7 is checked and the rearrangement of images already arranged on the sheet is permitted. And here, the second image 822 already arranged below the first image 821 of the area 810 shown in FIG. 8(a) is rearranged at the upper right of the area 810 as shown in FIG. 8(c). Further, the set up column 734 shown in FIG. 7 is checked and the arrangement of images turning sideways is permitted. And here, the third image 823 shown in FIG. 8(b) is arranged sideways below the first image 821 and the second image 822 after the rearrangement in the area 810.

Figure 8D:
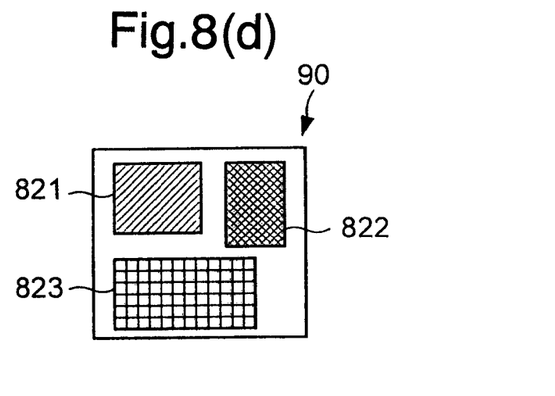

FIG. 8(d) shows a result of an image output to a sheet. Here, the roll sheet is cut at the position corresponding to the dotted line 812 indicative of the cut position that is the size ⅔ of the maximum size on the area 810 in which the first image 821, the second image 822 and the third image 823 shown in FIG. 8(c) are disposed, and there is shown a sheet 90 in which the above-mentioned three images are disposed.

On the job layout preview screen 800, for example, as shown in FIG. 8(a), there are disposed the first image 821 and the second image 822. Even if it is concerned with a state that the next image may be further disposed, when the print button 640 (cf. FIG. 6) is clicked, as mentioned above, it is possible to output the image in such a state.

According to the example shown here, both the set up column 733 and the set up column 734 have been checked, and while the rearrangement of images already disposed on a sheet, and an arrangement in which images turn sideways are permitted, it is possible to select also processing in which the set up column 733 and the set up column 734 are not checked.

On the set up column 733, when there is selected processing that the rearrangement of images already disposed on a sheet is not permitted, processing in which the new image is disposed is executed, while the arrangement position of the images already disposed on a sheet is fixed. In case of this set up, arithmetic operation time can be reduced as compared with a case where the rearrangement is permitted, and thereby expecting the faster processing speed.

Further, on the set up column 734, when there is selected processing that an arrangement in which images turn sideways is not permitted, there is executed processing that images are arranged by the number permitted in arrangement on a sheet of paper as many as possible, without changing a direction of an image. In case of this set up, a direction of the disposed image is fixed. This feature makes it possible to obtain images easy to see as compared with a case where the set up in which images turn sideways is permitted.

As mentioned above, according to the present invention, it is possible to prevent a large margin from remaining on the outputted sheet, and whereby the sheet is effectively utilized. Further, a permission of the rearrangement of images already arranged on a sheet and an arrangement in which images turn sideways makes it possible to contribute to the more effective utilization of a sheet.

While the present invention has been described with reference to the particular illustrative embodiments, it is not to be restricted by those embodiments but only by the appended claims. It is to be appreciated that those skilled in the art can change or modify the embodiments without departing from the scope and sprit of the present invention.

What is claimed is:

1. An image data output apparatus comprises:

a data obtaining section for sequentially obtaining a plurality of image data representative of a plurality of images;

a data editing section for performing a layout processing that images represented by the image data sequentially obtained by said data obtaining section are disposed in order of obtaining of the image data as many as possible on a maximum size of sheet of a plurality of predetermined sizes of sheets, and editing image data representative of images disposed as many as possible on the maximum size of one sheet so that the image data become image data representative of whole images to be recorded on the one sheet;

a sheet selection section for automatically selecting from among the plurality of predetermined sizes of sheets a minimum size of sheet capable of recording the whole images represented by image data edited by said data editing section; and a data output section for outputting the image data edited by said data editing section together with data representative of a size of a sheet onto which the whole images represented by the image data are recorded, wherein the layout processing is automatically performed based on a setting for a margin size of an edge portion of the one sheet and a setting for an interval size between images on the one sheet.

2. An image data output apparatus comprising:

a data obtaining section which obtains image data representative of a plurality of images;

a data editing section which arranges said image data on a maximum size of a sheet of a plurality of predetermined sizes of sheets, wherein a maximum number of said plurality of images are arranged on the sheet, and wherein said image data represents maximum sizes of said plurality of images;

a sheet selection section which automatically selects from among the plurality of predetermined sizes of sheets a minimum size sheet capable of recording said plurality of images represented by said image data; and a data output section which outputs said image data onto the minimum size sheet, wherein the data editing section arranges the image data automatically based on a setting for a margin size of an edge portion of the one sheet, and a setting for an interval size between images on the one sheet.

* * * * *